INVENTORS
ALEXANDER CYBRIWSKY
GERALD L. HAGER
DANIEL J. SCHARDEIN
BY Arthur W. Robert
THEIR ATTORNEY United States Patent Office 2,990,304
Patented June 27, 1961

2,990,304
METHOD OF COLORING ALUMINUM SURFACE
Alexander Cybriwsky, Gerland L. Hager, and Daniel J. Schardein, Louisville, Ky., assignors to Reynolds Metals Company, Richmond, Va., a corporation of Delaware
Filed July 10, 1957, Ser. No. 671,097
6 Claims. (Cl. 148—6.1)

In the art of decorating aluminum and other sheet metal surfaces with multi-color effects or patterns, wherein masking is used between successive color applications, difficulties have heretofore been encountered in one respect or another with the masking materials normally employed such as masking tape, lacquers, printing inks, waxes, etc. As a matter of fact, none of these materials satisfactorily meet the more important requirements which are enumerated as follows: (1) the masking material must adhere easily, quickly and firmly when applied; (2) it must be capable of forming sharply defined predetermined boundaries in all applications ranging from hair-line applications to other applications covering substantial areas; (3) it should be applicable in extremely thin films which do not creep or pinhole; (4) it should not smear; (5) it should withstand etching, bleaching and like actions; and (6) it should be easy to remove both quickly and completely.

Among the more important objects of the present invention are: to eliminate, avoid or minimize the difficulties heretofore encountered; to provide a novel process involving one or more aqueous color applications using a masking agent meeting the above noted requirements; to reduce the cost and labor involved in color treatments where a masking agent is used; and to provide a novel method utilizing a superior material for masking oxide-coated aluminum articles for color treatments involving an aqueous medium.

We have found that hydroabietyl alcohol, a colorless, tacky, nonvolatile alcohol of high molecular weight forming a viscous plastic material at room temperature appears to avoid the objections and meet the requirements in a highly satisfactory manner. This material can be applied easily, quickly and firmly. It is capable of forming sharply defined boundaries with very satisfactory thin films. It is not easy to smear, will withstand etching bleaching-like actions and can be removed easily, quickly and completely with conventional readily available inexpensive solvents.

Figure 1:
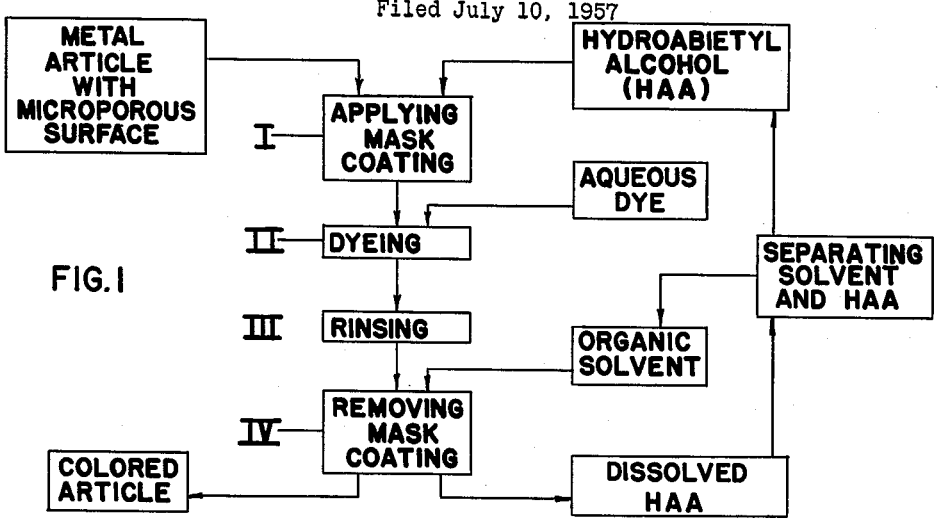
Figure 2:
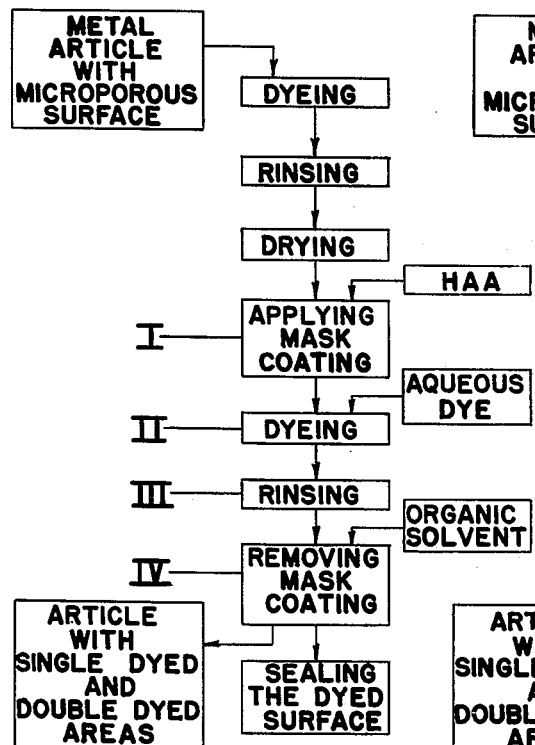
Figure 3:
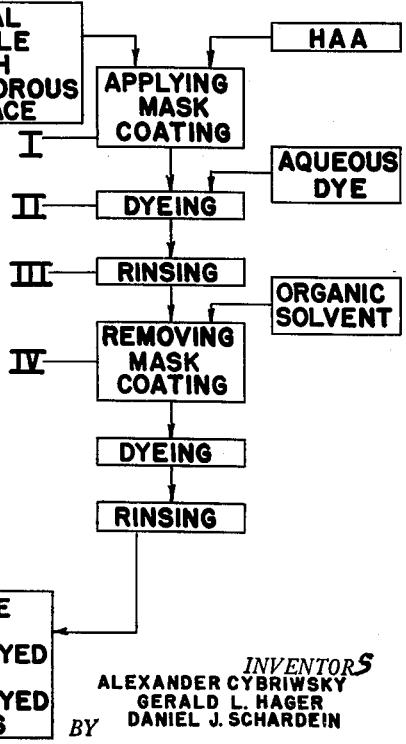

In the drawing:
FIG. 1 is a flow diagram depicting the basic steps of a method of practicing this invention and illustrating also, the recycling of the principal mask coating ingredient; and
FIGS. 2 and 3 are flow diagrams illustrating modifications of the process set forth in FIG. 1.

Hydroabietyl alcohol, in the commercially available form, is highly satisfactory in practicing the coloring process herein described. It is a colorless, tacky, viscous film-forming liquid or mobile plastic. While insoluble in water it is readily dissolved in various solvents such as: common organic solvents characterized by short carbon chain structures such as the lower aliphatic alcohols, ethers, esters, ketones, and chlorinated and other short chain hydrocarbons; aromatic hydrocarbons, such as benzene and toluene; and terpene hydrocarbons. The HAA mask is unaffected by the aqueous solutions normally required in a multiple coloring process, but it is instantly and cheaply removed by the more inexpensive organic solvents. HAA has a viscosity range which renders it sufficiently stable for use as a mask at all temperatures within the working temperature range normally employed in the dyeing of oxidized aluminum surfaces. At temperatures up to 180° F., the viscosity is approximately 1 poise. At such temperatures, masking coatings of hydroabietyl alcohol retain their continuity and pattern as provided at application.

HAA, as used in the present invention, may include any of the homologues: dihydroabietyl alcohol, tetrahydroabietyl alcohol, or dehydroabietyl alcohol, or mixtures thereof. Because of the difficulty of separating the homologues in the grade obtainable commercially, HAA, in one satisfactory composition used herein, is a rosin-derived product containing approximately a 40–45–15 blend of the above homologues in the order named, and about 15% of non-alcoholic material. This description is typical of the product "Abitol" manufactured by the Hercules Powder Company.

At room temperatures, hydroabietyl alcohol is a highly viscous, tacky compound about the consistency of printer's ink. Because of its resemblance to the latter, a preferable mode of masking application is by a conventional printing technique wherein HAA is placed on a printing roll in a measured amount by another roll in contact therewith. The printing surface of the printing roll may be relieved, or cut out in accordance with any pattern desired in masking the article to be colored. A printing roll which comprises a resilient material such as a synthetic or natural rubber vulcanizate, is found to be satisfactory. A medium hard rubber printing surface provides accurate line or boundary reproduction while assuring continuous coverage within the areas to be masked. The layer of HAA which is placed on the work piece as a mask coating, is comparable in thickness to that of the ink layer made by printer's ink, i.e., a film in order of 0.0001 inch in thickness. Because of the accuracy with which thin-line areas may be printed with the HAA, words and sentences may be reproduced in small type on aluminum articles by the present dyeing method.

To facilitate its application as a masking compound, HAA may be mixed with solvents to modify its physical properties. Dilution solely with a highly volatile solvent, such as acetone, if used in sufficient quantity, may result in segregation or gathering of the mask layer, as the solvent evaporates therefrom, into small areas or scales so separated as to allow access of a dye, bleach or other surface-modifying liquid to the surface of the work piece. In producing some articles, this condition may be desired for decorative purposes but, generally it is undesirable. Thus, a relatively non-volatile organic diluent or solvent such as butyl, amyl, or hexyl alcohol in amounts under 5% concentration reduces viscosity sufficiently to facilitate application, and remains in the masking coating to prevent scaling. Lanolin, as an example of a diluent of slightly different character, is highly miscible with HAA and, although it does not greatly affect the viscosity, it may be mixed with HAA up to 5% to improve the handling and application of the masking composition while avoiding the segregation effect described above.

Alternatively to the printing procedure described above, the masking coating may be readily placed on the oxide-coated metal by brushing on the HAA, in undiluted forms, or diluted as described above. However, because of its high viscosity, undiluted HAA is unsuitable for passing through a spray gun at ordinary temperatures. Spraying of undiluted HAA may be accomplished by apparatus which heats it to a temperature of at least 190° F. but, in general, it is more practical in preparing a spraying composition, to mix the HAA with a larger amount of low-viscosity highly-volatile solvent, such as ethyl alcohol, or acetone. The viscosity is thereby reduced to that level adapting the mixture for spraying. A small percentage of a relatively non-volatile diluent or solvent may be included to prevent the crazing of the masking coating which the volatile solvent would tend to produce. Since the success of HAA as a masking material is largely attributable to its viscosity and tack, mixing thereof with diluents or solvents is limited primarily to improving its transfer to the surface to be masked, and such modification is minimized insofar as practicable.

In the flow diagram provided by the drawing, it will be apparent that four basic steps are present in the three processes illustrated, i.e., (I) applying HAA as a masking coating to selected areas of the microporous surface of the metal article; (II) applying an aqueous dye to the masked article; (III) rinsing the article; and (IV) applying an organic solvent to the article to remove the masking coating. It is possible to omit the rinsing step (III) but any commercial process is greatly simplified by complete removal of excess dye material with a water rinse before removal of the masking coating with an organic solvent. Rinsing, of course, is essential in a process wherein recovery of the HAA is practiced. Recovery and recycling of the mask material is illustrated in FIG. 1.

It is also possible to modify or omit the mask removing step IV. After the final coloring step, the surface of the colored article is still partly coated with HAA, while part of the surface is dyed but unsealed. It has been discovered that HAA enters the microporous anodized surface when applied as a mask coating and may function as a sealing medium when incompletely removed from the surface in a solvent rinsing or wiping treatment which removes substantially all of the HAA lying above the surface of an anodized coating but does not substantially or completely extract it from the pores of the surface.

For example, after the final coloring treatment, the article may be rinsed, dried and then wiped with a felt or cloth containing an HAA solvent to soften the HAA masking sufficiently to enable it to be spread over the entire surface by the wiping action. The resulting HAA film will seal the porous surface of the anodized metal. If desired, the article may be immersed in, or sprayed by, an HAA solvent, such as butanol, which ordinarily does not effectively remove the HAA from the pores of the surface. The solvent may contain, for example, ½ to 1% of HAA for more effective impregnation of the heretofore unmasked area.

As a result of these treatments, the pores of the entire surface are filled with HAA which protects the surface from corrosion and the dye contained in the surface from deterioration under ordinary service conditions in which it is free from contact with organic solvents. An HAA seal coating is and preferably should be considerably thinner and lighter than the HAA mask coating used in the coloring operations. If the seal is too thin, the article may be further sealed by the conventional water treatment. HAA sealing may be substituted for the customary brief nickel-acetate sealing treatment which conventionally precedes the final water seal to prevent leaching of the dye in the water seal bath.

FIGS. 2 and 3 are typical of processes wherein the unmasked areas of the metal article are subjected to successive dye treatments and the color finally obtained is a blend of the colors produced separately by the dyes on undyed stock. For example, a blue dye superposed on a red dye, or vice versa, produces a maroon color; a green dye superposed on a yellow dye produces a lighter green. In FIG. 2, the four basic steps above are preceded by a dyeing step, whereby the masking coating subsequently applied, covers areas which are colored by the first dye application. The color of these masked areas is preserved as long as they are masked from succeeding dyeing treatments. In the process of FIG. 2, the article is finished with such areas being colored solely by the first dye. The areas that are unmasked and then colored by a second dyeing treatment of the process of FIG. 2 take final color which is a blend of both dyes.

FIG. 3 illustrates the basic four steps of FIG. 1, succeeded by a second dyeing treatment which colors the areas of the article that were exempted by the first dye treatment by masking to the same color as the second dye. However, the second dyeing treatment produces a color blend on the areas that were unmasked and subjected to the first dye treatment (step II).

The following examples will serve as specific illustrations of the invention.

*Example I*

A sheet of 16 gauge aluminum was anodized in a conventional manner in an 18% sulfuric acid bath for 20 minutes. The aluminum oxide coating thus formed had a thickness of at least 0.0002 inch. After rinsing to remove the acid, the sheet was dipped for 1 minute in an aqueous coloring bath at 130° F. containing 5 grams per liter of Sandoz Blue B dye (manufactured by the Sandoz Chemical Works, Inc.). The sheet was thereafter rinsed in cold water for 1 minute and dried for 1 minute. The entire sheet was dyed to a medium blue. Thereupon, the sheet was passed in firm rolling contact with a roll comprising an outer rubber sheath having ⅛ inch flat circumferential ribs about ⅞" apart. The ribs were continuously coated with hydroabietyl alcohol at room temperature which was transferred to the dried aluminum sheet in a striped pattern. Thereafter the sheet was immersed 1 minute in a coloring bath containing 5 grams per liter of Sandoz Red BRE maintained at 130° F. After rinsing, the sheet was washed with methyl alcohol to remove the mask coating of hydroabietyl alcohol. After drying, the aluminum sheet was found to be dyed in a two-tone pattern characterized by narrow stripes of the original blue color the sheet received from the first dyeing step alternating with maroon stripes obtained by exposure of the blue unmasked surface to the red dye.

*Example II*

A sheet of 18 gauge aluminum was anodized, rinsed, given an initial blue dye treatment, and masked in a striped pattern with hydroabietyl alcohol as described in Example I. Subsequently, the sheet was dipped in a bleaching solution at room temperature containing 16 ounces per gallon of water of a proprietary solution containing sulfuric and chromic acids manufactured by The Frederick Gumme Company, Inc. and labeled as "180K." The sheet remained in this bath for 10 seconds to remove the blue color from the unmasked areas. After being rinsed to thoroughly remove the bleach solution, the sheet was dipped into the red dye bath as described in Example I and rinsed. The hydroabietyl alcohol was dissolved from the masked areas by butanol. After dyeing, the sheet was found to have alternating blue and red stripes of which the boundaries had the sharpness of contour characterizing the printing ridges of the rubber printing roll.

*Example III*

A sheet of 20 gauge aluminum was anodized in the conventional manner within the anodizing bath of Example I for 45 minutes to obtain a layer of aluminum oxide of at least 0.0004 inch in thickness. The area of one face of the sheet was divided into 3 longitudinal sections of approximately equal width. The sheet was rinsed and dried and one section (section A) adjacent one edge of the sheet was coated with hydroabietyl alcohol applied by a brush. Thereafter, the sheet was dipped in a black dye bath at 130° F. for 45 minutes; and then rinsed and dried. The middle section (section B) was coated with hydroabietyl alcohol applied by a brush. Then the sheet was dipped in a bleach bath as described in Example II and rinsed. In this manner, the black dye was removed from section C. Thereafter the masked sections A and B were washed with butanol until free of hydroabietyl alcohol. At this point, sections A and C were colorless except for the natural silvery color of the oxide coating.

The sheet was then placed in a red dye bath similar to that of Examples I and II, for 1 minute, removed and rinsed. The middle section was found to have retained the deep black color through the red dye treatment and the side sections A and C were dyed to a red of darker shade than the red areas in the sheet of Example II because of the thicker oxide coating. It may be noted that section A was dyed red after being originally masked to avoid dyeing by the black dye whereas section C was once dyed black and then bleached before being dyed red.

For rendering the dyed oxide coatings of the colored aluminum sheets produced in the above examples resistant to outside attack, the coatings may be sealed to trap the dye within the micropores thereof by treatments, such as by dipping the sheets for a minute or two in a ½% hot solution of nickel acetate, or for a longer period in boiling water. In case of thicker anodic coatings, e.g., those having a thickness of 0.0006 inch or more, the sealing treatment should be extended to 20 minutes or more. A preferred method of permanent sealing is to immerse the sheets in the hot nickel solution for 2 to 5 minutes to seal the dye against leaching in hot water, and then into a hot water bath for 15 to 30 minutes, maintained at a temperature near boiling.

The process of the present invention obviates to a great degree the difficulties attending the masking and mask-removing operations that have in the past complicated the application of two or more colors to oxide-coated metals and/or prevent attainment of top quality coloring. In applying masking compounds comprising hydroabietyl alcohol as herein described, a combination of advantages have been achieved in the process as a whole not achieved in any one of the prior art processes, i.e., ease of application, formation of continuous extremely thin mask coatings, ease of mask-removal, capability to hold boundaries and thin-line contours accurately, continuously masking films of extreme thinness which are free of pinholes and other blemishes, freedom from creeping and smearing of the mask coating as the result of the thin films that may be used, and convenience and rapidity in stripping the mask coating from the work.

Having described our invention, we claim:

1. A method of coloring a microporous metal surface comprising: masking a first selected area of said surface with a composition consisting essentially of hydroabietyl alcohols while leaving a second area unmasked; and coating said unmasked second area with a coloring material which permeates the pores of said surface.

2. The method of claim 1 comprising: removing said hydroabietyl alcohol mask with an organic solvent in which the color coat is insoluble.

3. The method of claim 1 comprising: sealing said colored surface with a composition consisting essentially of hydroabietyl alcohols.

4. The method of claim 2 including: masking a third area leaving a fourth area unmasked; and coating said fourth area with a coloring material which permeates the pores of said surfaces.

5. The method of claim 4 including: sealing the final colored surface with a composition consisting essentially of hydroabietyl alcohols.

6. A method of producing a colored metal surface comprising: providing an anodized aluminum surface; masking a first selected area thereof with a composition consisting essentially of hydroabietyl alcohols while leaving a second area unmasked; and dyeing said unmasked second area with a coloring material.

References Cited in the file of this patent
UNITED STATES PATENTS

| | | |
|---|---|---|
| 315,324 | Painter | Apr. 7, 1885 |
| 318,882 | Dittman | May 26, 1885 |
| 2,047,597 | Rothrock | July 14, 1936 |
| 2,150,409 | Yasoshima | Mar. 14, 1939 |
| 2,186,721 | Guild | Jan. 9, 1940 |
| 2,401,306 | Lavallee | June 4, 1946 |
| 2,614,912 | Rice | Oct. 21, 1952 |
| 2,769,265 | Page | Nov. 6, 1956 |
| 2,778,790 | Sobol | Jan. 22, 1957 |
| 2,812,295 | Patrick | Nov. 5, 1957 |